(12) United States Patent
Zieglmeier et al.

(10) Patent No.: US 10,252,670 B2
(45) Date of Patent: Apr. 9, 2019

(54) METHOD AND CONTROL SYSTEM FOR OPERATING A MOTOR VEHICLE

(71) Applicant: AUDI AG, Ingolstadt (DE)

(72) Inventors: Sebastian Zieglmeier, Rottenburg (DE); Shuai Tang, Beijing (CN); Markus Popken, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/170,485

(22) Filed: Jun. 1, 2016

(65) Prior Publication Data
US 2016/0355132 A1     Dec. 8, 2016

(30) Foreign Application Priority Data
Jun. 2, 2015   (CN) .......................... 2015 1 0295676

(51) Int. Cl.
*B60Q 9/00* (2006.01)
*G08G 1/16* (2006.01)
*B60K 35/00* (2006.01)

(52) U.S. Cl.
CPC .............. *B60Q 9/008* (2013.01); *B60K 35/00* (2013.01); *B60Q 9/006* (2013.01); *B60Q 9/007* (2013.01); *G08G 1/165* (2013.01); *G08G 1/166* (2013.01); *G08G 1/168* (2013.01)

(58) Field of Classification Search
CPC ........ B60Q 9/006; B60Q 9/007; B60Q 9/008; B60K 35/00; G08G 1/166; G08G 1/168; G08G 1/165
See application file for complete search history.

(56) References Cited

U.S. PATENT DOCUMENTS

2009/0237293 A1\*  9/2009  Sakuma ................ G01S 5/0072
                                                     342/146
2013/0293369 A1   11/2013  Reilhac et al.

FOREIGN PATENT DOCUMENTS

CN      201510295676.2      6/2015
DE      102008019461 A1    10/2009
DE      102008019461 A1 \* 10/2009 ............. B60K 35/00

\* cited by examiner

*Primary Examiner* — Yuen H Wong
(74) *Attorney, Agent, or Firm* — Staas & Halsey LLP

(57) ABSTRACT

Respective movements and positions of traffic participants arranged within a monitoring range surrounding a motor vehicle are captured on the front side, on the rear side, and/or laterally, by several sensors of the motor vehicle. One characteristic value per traffic participant is established which quantifies a collision probability of the motor vehicle with the respective traffic participants in dependency on the captured movements and positions of the traffic participants and the movement and position of the motor vehicle. At least one warning message is issued with respect to the traffic participants, for which the established characteristic values reach a predetermined collision probability value, wherein the warning message is signaled in which direction of the motor vehicle the respective collisions are impending.

15 Claims, 3 Drawing Sheets

METHOD AND CONTROL SYSTEM FOR OPERATING A MOTOR VEHICLE

CROSS REFERENCE TO RELATED APPLICATIONS

This application claims the benefit of Chinese Application No. 201510295676.2 filed on Jun. 2, 2015, incorporated by reference herein in its entirety.

BACKGROUND

From the related art various driver assistance systems are known by which the driver of a motor vehicle can be alerted to objects in the environment of the motor vehicle.

The US 2013/0293369 A1 for instance shows a parking assistant by which a driver of a motor vehicle can be supported in maneuvering out of a parking space. Data from several sensors on the motor vehicle are displayed in a top view during the process of maneuvering out of a parking space, wherein respective distances from captured objects are indicated.

The DE 10 2008 019 461 A1 shows a device and method for displaying information in a vehicle. Using sensors, objects in the environment of the motor vehicle are captured. An encoded display shows how the captured objects are positioned relative to the motor vehicle.

Described below are a method and a control system for operating a motor vehicle, by which a driver of a motor vehicle can be better warned against potential collisions with other traffic participants.

SUMMARY

According to the method for operating a motor vehicle, the following is performed:
- capturing respective movements and positions of traffic participants (20, 22), which are arranged within a monitoring range (24) surrounding the motor vehicle (10) on the front side, on the rear side, and/or laterally, using several sensors (14) of the motor vehicle (10);
- establishing one characteristic value per traffic participant (20, 22), which quantifies a collision probability of the motor vehicle (10) with the respective traffic participants (20, 22) in dependency on the captured movements and positions of the traffic participants (20, 22) and the movement and position of the motor vehicle (10);
- issuing at least one warning message with respect to the traffic participants (20, 22), for which the established characteristic values reach a predetermined collision probability value, wherein the warning message signals in which direction of the motor vehicle (10) the respective collisions are impending.

The method described herein is preferably employed during inner-city drives of the motor vehicle. In this connection it may for instance be envisaged that the method is activated and permanently performed automatically, i.e. without the driver's acting, in case the motor vehicle moves within a certain velocity range, for instance of 10 km/h to 40 km/h. Alternatively, it may also be envisaged that the driver of the motor vehicle must first activate the method before it can be performed. The monitoring range in this connection can be preferably adapted automatically to the respective captured traffic situation. If the motor vehicle for instance drives at a relatively high velocity, the monitoring range is extended, wherein the monitoring range is reduced, in case the motor vehicle moves at a somewhat reduced velocity.

Consequently, it is envisaged according to the method to estimate per captured traffic participant, how likely a collision of the motor vehicle with the respective traffic participants is. In this connection for establishing the characteristic value that quantifies how likely the respective collisions of the motor vehicle with the other captured traffic participants are, the respective movements and positions of the traffic participants and the movement and position of the motor vehicle, which are captured on the basis of a sensor, are considered. By using the method, consequently, on the basis of an observation of the other traffic participants it is established how large the likelihood of a collision with the respective traffic participants is.

By issuing at least one warning message with respect to those traffic participants, for which the established characteristic values reach a predetermined collision probability value, and due to the fact that the warning message signals at which place of the motor vehicle respective collisions are impending, a driver of the motor vehicle in a particularly simple and reliable way can be alerted to possibly impending collisions with other traffic participants, so that he can adapt his driving behavior to avoid the possibly impending collision. In other words, the driver of the motor vehicle is informed, by the method, in good time of impending dangers, in particular in the form of possible collisions with other traffic participants so that he can either still prevent impending collisions or reduce the caused damage. Thereby on the whole the operation of the motor vehicle is rendered considerably safer. The driver of the motor vehicle thus gains an improved overview of the environment of his motor vehicle so that it is essentially less likely that the driver is involved in accidents.

In an advantageous embodiment, it is envisaged that as the warning message an optical warning message is issued. This could happen by a display unit of the motor vehicle by displaying respective symbols, by which it is indicated in which directions the respective collisions are impending, whereby particularly the position of the motor vehicle is preferably displayed on the centre of the display unit. This means that the driver can recognize at a single glance from which side of the motor vehicle respective dangers are impending. This is because a single glance at the display unit shows the driver at which place of the motor vehicle, i.e. from which direction, the respective collisions are impending so that the driver can respond particularly fast in order to control the motor vehicle in such a way that the impending collisions are fended off or the severity of their impact can be reduced.

In a further advantageous embodiment, it is envisaged that respective distances between the motor vehicle and those traffic participants for which the characteristic value reaches the predetermined collision probability value, are indicated by a display unit. This means that the driver is not only notified of the direction from which the respective collisions with other traffic participants are impending, but he also is informed about the distance of the other traffic participants, with which a collision might happen, from his motor vehicle. The respective distances between the motor vehicle and the other traffic participants for instance can be accordingly indicated by the display unit, wherein for instance fences between the displayed motor vehicle and the further traffic participants can be used for visualizing the distances between the motor vehicle and the other traffic participants. Due to the fact that also the respective distances between this motor vehicle and the traffic participants, with whom possible collisions are impending, are indicated to the driver of the motor vehicle, he is in a position to respond even better to critical traffic situations and control his motor vehicle correspondingly in order to fend off impending collisions with the respective traffic participants.

According to a further advantageous embodiment, it is envisaged that by the display unit an environment captured by onboard cameras in front of, to the side of, and behind the motor vehicle is displayed from the aerial perspective, i.e. in a top view, in addition to the info about the direction of the danger. Thus, a particularly realistic representation of the environment of his motor vehicle is indicated to the driver so that he can capture more detailed information about the traffic participants with which collisions are possibly impending so that he is in a position to respond even better to critical traffic situations.

In a further advantageous embodiment, it is envisaged that several predetermined collision probability values are defined and assigned to respective warning levels, whereby for each warning level a certain symbol is defined and displayed if the characteristic value reaches the respective collision probability values. The driver of the car can easily recognize based on the different symbols how critical an actual situation is, especially how likely potential collisions with other traffic participants are.

In a further advantageous embodiment, it is envisaged that as the warning message or as a further warning message an acoustic warning notice is issued by a loudspeaker of the motor vehicle, wherein by the acoustic notice it is indicated, at which place of the motor vehicle respective collisions are impending. It may for instance happen that a collision at the right front side of the motor vehicle is impending. In such a case it may for instance be envisaged that a warning message "front right" is issued so that the driver can capture particularly fast at which place of the motor vehicle and from which direction a corresponding collision with a traffic participant is impending. Due to the fact that the warning message or a further warning message is issued as an acoustic warning notice, the driver is in a position to capture impending dangerous situations even better.

Besides the already mentioned optical and acoustic warning signals, it is also possible—alternatively or additionally—that further warning signals are output, for example: as a warning of a possible lateral collision a momentum is applied on the steering wheel and/or a vibration at the respective side of a driver's seat is caused; as a warning for a possible front collision a force is applied on the gas pedal and/or a short breaking impulse is applied. Substantially, all kinds of warnings signals—optical, acoustical or tactile signals—can be used to warn the driver of any potential collisions with other traffic participants.

In a further advantageous embodiment, it is envisaged that the acoustic warning notice is issued only with respect to those traffic participants, which characteristic values reach the highest of the predetermined collision probability values. Preferably, it is envisaged in this connection that exclusively the optical warning message is issued as long as the characteristic values lie below the highest of the predetermined collision probability value. In other words, it is preferably envisaged that a staggered warning of the driver is effected, wherein the acoustic warning notice is not issued until it is determined with a raised degree of likelihood that a collision with another traffic participant is impending. As long as it can be expected with a relatively low degree of likelihood that possible collisions might be impending, the driver is warned merely by the optical warning message. By this warning in stages the driver of the motor vehicle is not needlessly distracted from the traffic situation by additional acoustic warning notices, which renders the driving of the motor vehicle even safer.

A further advantageous embodiment, envisages that on the basis of the captured movements and positions of the traffic participants respective future movement paths are extrapolated for the traffic participants, wherein the extrapolated paths of movement of the traffic participants are compared with an extrapolated movement path of the motor vehicle in order to establish the respective characteristic values. For instance a kind of digital environment map can be drawn, by which the respective established paths of movements of the traffic participants and the motor vehicle are deposited. On the basis of the movements of the traffic participants captured up to then it is consequently estimated how these will move in the future, wherein these estimates are compared with an extrapolated movement path of the motor vehicle in order to estimate how likely collisions with the respective traffic participants are. In case, for example, on the basis of the extrapolated movement paths of the traffic participants and the movement path of the motor vehicle it is established that some of the movement paths of the traffic participants and the movement path of the motor vehicle intersect, it can at least be expected that a certain likelihood is given that a collision between the respective traffic participant and the motor vehicle might occur.

In order to facilitate a once again improved estimate of the respective likelihoods of impending collisions between the traffic participants and the motor vehicle, according to a further advantageous embodiment it is envisaged that on the basis of the captured movements and positions of the traffic participants respective future velocity profiles of the traffic participants are compared with an extrapolated velocity profile of the motor vehicle in order to establish respective characteristic values. By estimating the future velocities at which the traffic participants travel and in consideration of an expected velocity at which the motor vehicle will move along, it can be estimated in a further enhanced way how likely respective collisions between the motor vehicle and the other traffic participants are. In particular, if the extrapolated movement paths and the extrapolated velocity profiles are evaluated together, it can be established in a particularly reliable way how likely certain collisions between the other traffic participants and the motor vehicle will be. Should for example the extrapolated movement paths of the traffic participants and the movement path of the motor vehicle intersect, it can moreover be considered how fast the respective traffic participants and the motor vehicle will travel in the future in order to find out whether the motor vehicle and the other traffic participants will meet at all at a respective intersection point of the movement paths. If only the movement paths intersect, a reduced danger of collision is presumed, wherein, in case the movement paths should intersect, and on the basis of the extrapolated velocity it is established that it is very likely that the motor vehicle and the other traffic participants will arrive at the intersection point essentially at the same time, it is to be reckoned with a very high danger of collision.

A further advantageous embodiment envisages that as sensors radar sensor, laser sensors, and/or cameras of the motor vehicle are used in order to capture the movements and positions of the traffic participants. For capturing and evaluating the movements and positions of the traffic participants, it is also possible in this connection that on the basis of the respective captured sensor data a sensor data fusion is conducted by at least two of the above mentioned sensors in order to be able to capture and evaluate the movements and the positions of the traffic participants in a particularly exact way.

The control system described below for operating a motor vehicle has several sensors, which are configured to capture respective movements and positions of traffic participants, which are arranged within a monitoring range surrounding the motor vehicle on the front side, on the rear side and/or laterally. The control system moreover includes a control unit, which is configured to establish in dependency on the captured movements and positions of the traffic participants and the movement and position of the motor vehicle one characteristic value per traffic participant, which quantifies a collision probability of the motor vehicle with the respective traffic participants. The control system further includes a warning device, which is configured to issue at least one warning message with respect to the traffic participants, for which the established characteristic values reach a predetermined collision probability value, wherein the warning device is configured to signal by the warning message in which direction of the motor vehicle the respective collisions are impending. Advantageous embodiments of the method are to be regarded as advantageous embodiments of the control system, wherein the control system is capable of performing the method.

A motor vehicle may include the control system described below, or an advantageous embodiment of the control system.

Further advantages, features, and details of the invention derive from the following description of preferred embodiments as well as from referring to the drawing. The features and feature combinations previously mentioned in the description and named in the following in the description of the figures and/or shown in the figures alone are not only employable in the respective indicated combination, but also in any other combination or taken alone, without leaving the scope of the invention.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Reference will now be made in detail to the preferred embodiments, examples of which are illustrated in the accompanying drawings, wherein same elements or elements having same functions have the same reference signs.

Figure 1:
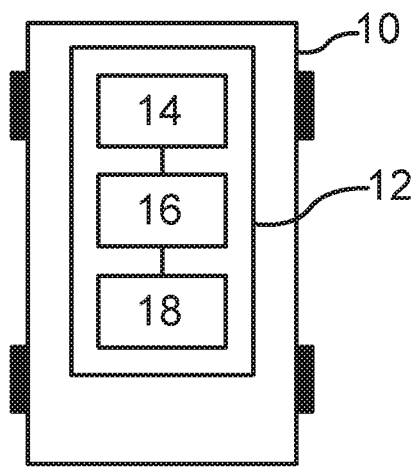
FIG. 1 is a schematic top view of a motor vehicle, which includes a control system for operating a motor vehicle.

A motor vehicle 10 is shown in a schematic view in FIG. 1. The motor vehicle 10 includes a control system 12 for operating the motor vehicle 10. The control system 12 has several onboard sensors 14, wherein merely as an example one of the sensors 14, an onboard control unit 16, and a warning device 18 are shown. The sensors 14 of the motor vehicle 10 are configured to capture respective movements and positions of traffic participants, which are arranged within a monitoring range surrounding the motor vehicle 10 on the front side, on the rear side and/or laterally. The sensors 14 can be for example at least one of these sensors: a radar sensor, an ultrasonic sensor, a laser sensor, or a camera.

The onboard control device 16 is configured to establish in dependency on the captured movements and positions of the traffic participants and the movement and the position of the motor vehicle 10 a characteristic value per traffic participant, the characteristic value quantifying how likely a collision of the motor vehicle 10 with the respective traffic participants is. The warning device 18 may be, for example, a display device of the motor vehicle 10 and/or also loudspeakers of the motor vehicle 10. The warning device 18 is configured to issue at least one warning message with respect to those traffic participants, for which the established characteristic values exceed a predetermined value of likelihood of a collision to happen with the motor vehicle 10, wherein a warning device 18 is configured to signal by the warning message at which place of the motor vehicle 10 the respective collisions are impending.

Figure 2:
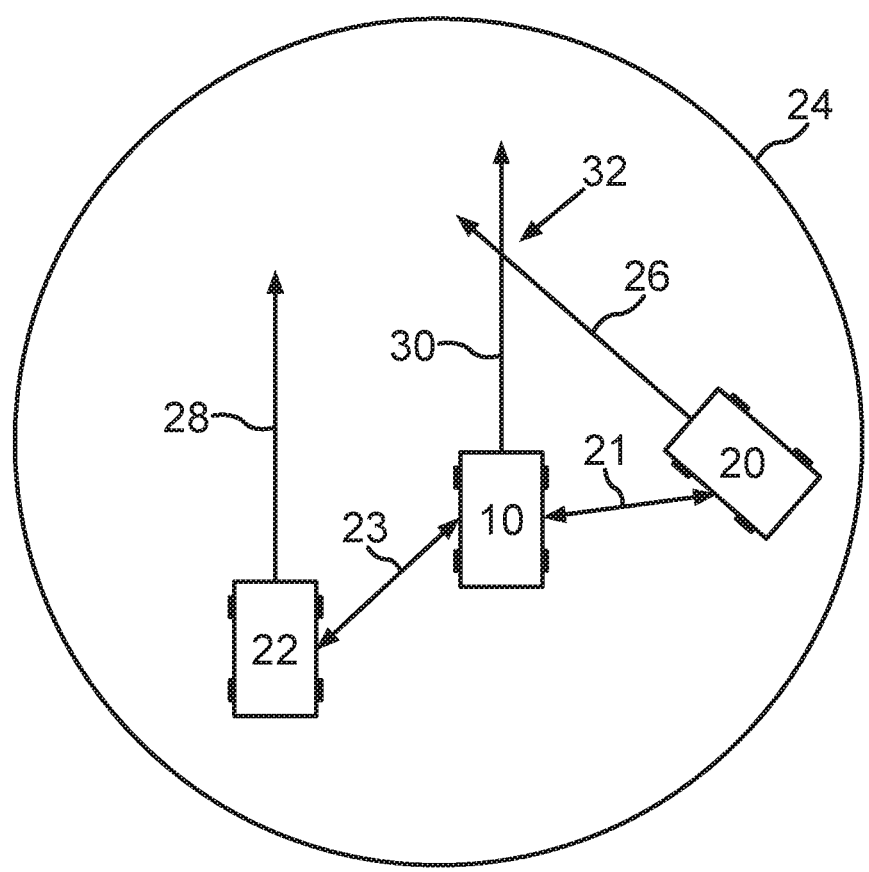
FIG. 2 is a schematic top view of a traffic situation, in which the motor vehicle shown in FIG. 1 and further traffic participants are shown, which are arranged within a monitoring range surrounding the motor vehicle.

In FIG. 2 the motor vehicle 10 and further traffic participants 20, 22 are shown in a schematic top view. Moreover, the afore-mentioned monitoring range 24 surrounding the motor vehicle 10 on the front side, on the rear side, and laterally is indicated schematically. In the following a method for operating a motor vehicle 10 is explained in more detail. The sensors 14 capture respective movements and positions of the traffic participants 20, 22, which are within the monitoring range 24. The size and form of the monitoring range 24 in this connection can be adjusted for example in dependency on the present velocity of the motor vehicle 10 and/or the type of road presently travelled on, for instance a narrow inner-city one-way street, a city motorway, a country road, or the like. The control unit 16 establishes one characteristic value per traffic participant 20, 22, which quantifies how likely a collision of the motor vehicle 10 with the respective traffic participant 20, 22 is. The establishing of these characteristic values in this connection is effected in dependency on the captured movements and positions of the traffic participants 20, 22 and the movement and position of the motor vehicle 10. The warning device 18 issues at least one warning message with respect to those traffic participants 20, 22, for which the established characteristic values exceed a predetermined value of likelihood of a collision to happen with the motor vehicle 10, whereby the warning message indicates at which place of the motor vehicle the respective collisions are impending.

On the basis of the captured movements and positions of the traffic participants 20, 22 respective future movement paths 26, 28 are extrapolated for the traffic participants 20, 22. Moreover, the control unit 16 also extrapolates a movement path 30 of the motor vehicle 10. Moreover, the control unit 16, on the basis of the captured movements and positions of the traffic participants 20, 22, extrapolates respective future velocity profiles of the traffic participants 20, 22. When establishing the characteristic values in order to estimate how likely the respective collisions are between the motor vehicle 10 and the other traffic participants 20, 22, on the one hand, the extrapolated movement paths 26, 28 of the traffic participants 20, 22 are compared with the extrapolated movement path 30 of the motor vehicle. On the other hand, for the establishing of the characteristic values additionally the extrapolated velocity profiles of the traffic participants 20, 22 are compared with the extrapolated velocity profile of the motor vehicle 10. Moreover, also respective distances 21, 23 or distances between the traffic participants 20, 22 and the motor vehicle 10 can be captured and considered when estimating the likelihoods of collision.

Should it for instance be established, as it is schematically shown in FIG. 2, that the extrapolated movement paths 26, 30 of the traffic participants 20 and the motor vehicle 10 intersect, it is assumed at least with a certain likelihood that a danger of collision between the motor vehicle 10 and the traffic participant 20 exists. In case in consideration of the extrapolated velocity profiles of the motor vehicle 10 and the further traffic participants 20 it is established that the motor vehicle 10 and the traffic participant 20 arrive essentially simultaneously at the intersection point 32 of the two extrapolated movement paths 26, 30, a particularly high characteristic value is established, for instance with a likelihood of 100 percent, which characterizes that the motor vehicle 10 and the traffic participant 20 will probably collide.

As the warning message can for instance be issued an optical warning message, by the motor vehicle 10 and respective symbols 36, 38 being represented by a display unit 34 of the motor vehicle 10, which is shown in an exemplary way in FIGS. 3 to 6, by which it is indicated at which place of the motor vehicle 10 the respective collisions are impending.

Figure 3:
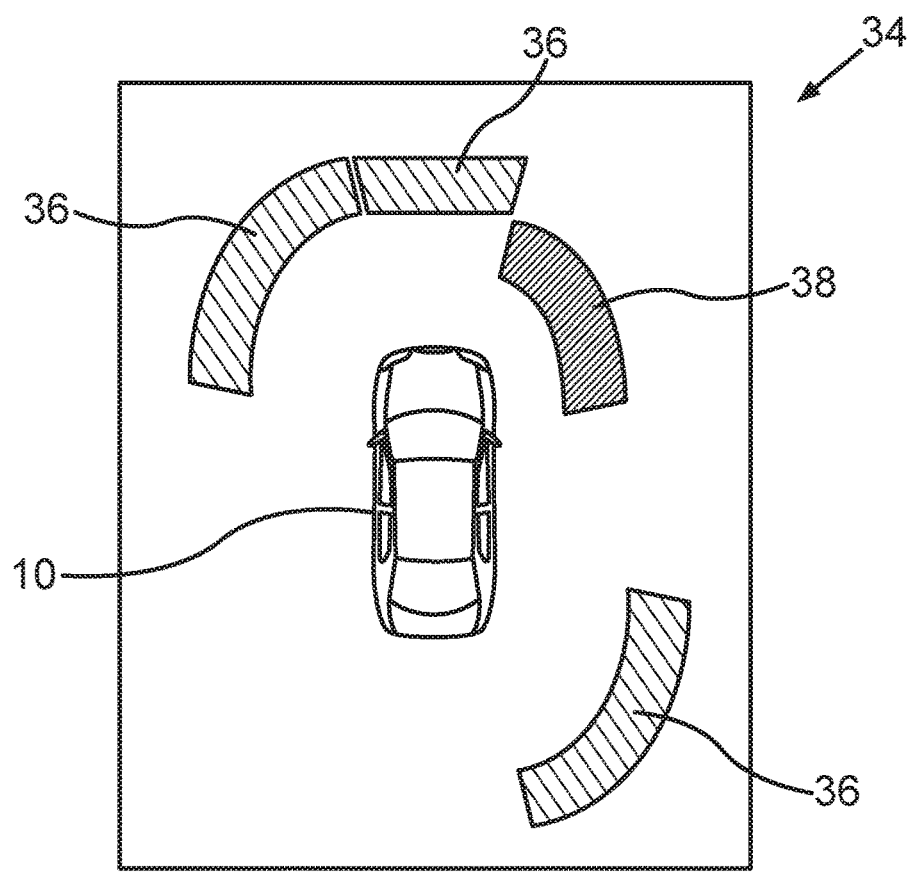
FIG. 3 is a schematic view of a display unit of the motor vehicle, wherein different symbols are used to alert the driver to an impending collision with one of the traffic participants.

In FIG. 3, the output on the display unit 34 is shown in a schematic view. According to the embodiment shown here, it is indicated by the symbols 36, 38, from which direction respective dangers of collision are impending with different traffic participants 20, 22. In this connection, the output of the display unit 34 of the motor vehicle 10 is shown in a schematic view. For instance, for the cases in which it has been established that at least the extrapolated movement paths 26, 28 of the traffic participants 20, 22 intersect with the extrapolated movement path 30 of the motor vehicle 10 within a short period of time, the symbols 36 are highlighted in a distinct color, for example in white. In case it is established that at least the extrapolated movement paths 26, 28 of the traffic participants 20, 22 intersect with the extrapolated movement path 30 of the motor vehicle 10 within a even shorter period of time, it may be envisaged that the symbol 38 is additionally colored in an even more distinct color, for example red, and is shown closer than the other symbols 36 towards the symbolically represented motor vehicle 10. Respective distances 21, 23 between the motor vehicle 10 and the traffic participants 20, 22, with which a collision is impending with a certain likelihood, could also be indicated by the display unit 34 in an embodiment in which the color is representing the likelihood of a collision whilst the distance of the active segment towards the car could represent the actual distance instead of being another representation of the likelihood of a collision.

Figure 4:
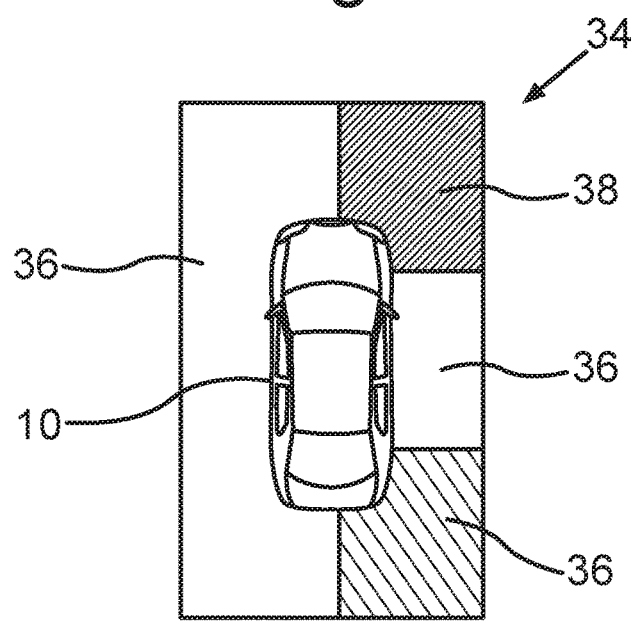
FIG. 4 is a further schematic view of the display unit of the motor vehicle, wherein it is warned in an alternative way against an impending collision with one of the traffic participants.

In FIG. 4 an alternative representation of the optical warning message is shown. On the display unit 34, in turn, respective symbols 36, 38 are displayed, by which it is indicated how likely respective collisions between the motor vehicle 10 and further traffic participants 20, 22 have been estimated to be. In the present case the symbols 36, 38 are shown merely in the form of tiles, wherein by a color encoding the likelihood of a collision is indicated.

Figure 5:
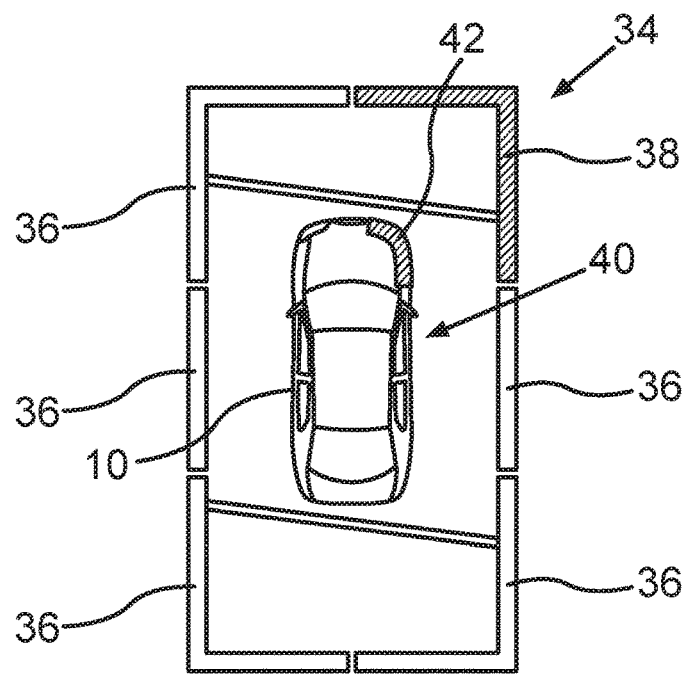
FIG. 5 is a further representation of the display unit of the motor vehicle, wherein a further option for alerting of an impending collision with one of the traffic participants is shown; and in FIG. 6 is a further view of a display unit, wherein a further option for indicating an impending collision with one of the traffic participants is shown.

In FIG. 5 a further optical warning message is shown. The display unit 34 is shown again. In FIG. 5, the display unit 34 shows an environment 40 in front of, to the side of, and behind the motor vehicle 10, as captured by onboard cameras, from an aerial perspective. Thereby a particularly realistic representation of the motor vehicle 10 is rendered for the driver of the motor vehicle 10. The symbols 36, 38 in this connection are represented as outline of the displayed aerial perspective. In addition to the symbols 36, 38 by a further symbol 42 it is indicated at which place of the motor vehicle 10 a collision with one of the other traffic participants 20 is impending to probably happen. By a corresponding coloring of the symbols 38, 42, for instance in red, it can be indicated once more to the driver of the motor vehicle 10 from which direction and at which place of the motor vehicle 10 an increased likelihood of collision with one of the traffic participants 20, 22 exists.

Figure 6:
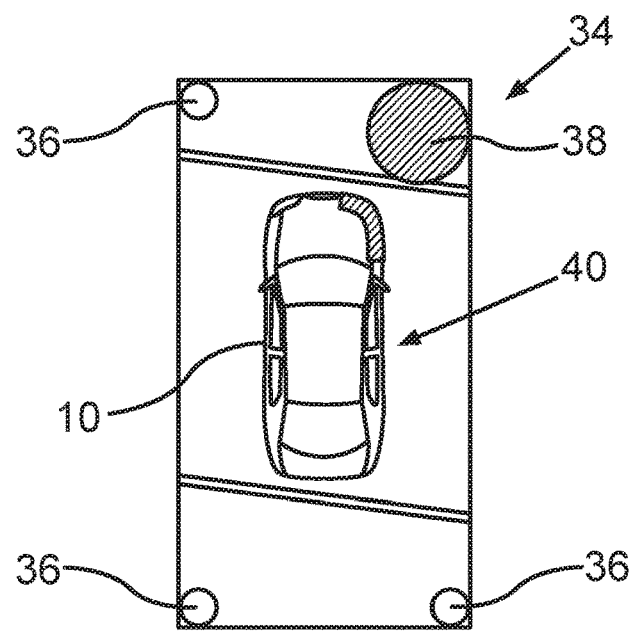

In FIG. 6 a further alternative optical warning option is shown. The display unit 34 again shows several symbols 36, 38 to indicate respective likelihoods of collision of the motor vehicle 10 with the further traffic participants 20, 22. In FIG. 6, the display unit 34 again shows the environment in front of, to the side of, and behind the motor vehicle 10, as captured by onboard cameras, from the aerial perspective. In the present case the symbols 36, 38 are merely configured as circles, wherein the symbol 38 is displayed to be larger than the other symbols 36 and possibly also with a different coloring, in order to indicate to the driver of the motor vehicle 10 that a danger of collision is impending from the right front.

Additionally to the optical warning of the driver of the motor vehicle 10 indicated by the display unit 34, it may also be envisaged that an acoustic warning notice is issued by a loudspeaker of the motor vehicle 10, as soon as on the basis of the characteristic values a certain likelihood has been established that a collision of the motor vehicle 10 with one of the other traffic participants is impending. The acoustic notice indicates at which place of the motor vehicle 10 the respective collisions are impending and from which direction the collisions are impending. For the case schematically demonstrated in FIG. 2 it can be indicated for instance by the loudspeaker that a collision is impending from the right front. The acoustic warning notice may be issued only with respect to those traffic participants 20, 22, the characteristic values of which have a particularly high value of likelihood, wherein exclusively the optical warning message is issued as long as the characteristic values still remain below this raised value of likelihood. The driver of the motor vehicle 10 consequently is warned in stages, wherein he is first informed about possible dangers of collision by the display unit 34 and an acoustic warning notice is only then effected, if a particularly high danger of collision with one of the other traffic participants 20, 22 has been established.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method for operating a motor vehicle having a front, a rear and sides, comprising:
   capturing respective movements and positions of traffic participants within a monitoring range around the motor vehicle on at least one of the front, the rear, and the sides of the motor vehicle, by several sensors of the motor vehicle;
   establishing, by a control unit, a single characteristic value per traffic participant, quantifying a collision probability value of the motor vehicle representing a likelihood of collision between the motor vehicle and each of the traffic participants based on a comparison between respective future movements in respective extrapolated movement paths and future positions of the traffic participants and movement and position of the motor vehicle in an extrapolated movement path;
   assigning, by the control unit, several predetermined collision probability values to respective warning levels;
   defining, by the control unit, for each warning level, a corresponding symbol;
   displaying the corresponding symbol as the single characteristic value of a respective traffic participant reaches each of the respective collision probability values; and
   issuing at least one warning of at least one impending collision when the single characteristic value of at least one of the traffic participants reaches a predetermined collision probability value, the warning indicating a direction, relative to the motor vehicle, of the at least one impending collision.

2. The method according to claim 1, wherein the at least one warning is an optical warning message issued by displaying on a display unit of the motor vehicle at least one symbol, each symbol indicating a direction of the at least one impending collision, and a position of the motor vehicle being displayed on a center of the display unit.

3. The method according to claim 2, wherein the display unit indicates respective distances between the motor vehicle and the at least one of the traffic participants for which the single characteristic value reached the predetermined collision probability value.

4. The method according to claim 2, wherein the display unit displays an environment captured by onboard cameras in front of, laterally and behind the motor vehicle from an aerial perspective.

5. The method according to claim 1, wherein the at least one warning includes a further warning with an acoustic warning notice, issued by a loudspeaker of the motor vehicle, indicating a portion of the motor vehicle where the at least one impending collision is expected.

6. The method according to claim 5,
   wherein predetermined collision probability values are assigned to respective warning levels, and
   wherein the acoustic warning notice is issued only when the single characteristic value of the at least one of the traffic participants reaches a highest of the predetermined collision probability values.

7. The method according to claim 6, wherein the at least one warning is an optical warning message exclusively issued as long as the single characteristic value of each of the traffic participants is below the highest of the predetermined collision probability values.

8. The method according to claim 1, further comprising:
   extrapolating, based on the respective movements and positions of the traffic participants, respective future velocity profiles of the traffic participants; and
   wherein said establishing includes comparing the respective future velocity profiles of the traffic participants with an extrapolated velocity profile of the motor vehicle to establish respective characteristic values.

9. The method according to claim 1, wherein the sensors include at least one of radar sensors, laser sensors and cameras of the motor vehicle employed in capturing the movements and positions of the traffic participants.

10. A control system for operating a motor vehicle having a front, a rear and sides, comprising:
    sensors configured to capture respective movements and positions of traffic participants within a monitoring range around the motor vehicle on the front, the rear and the sides;
    a control unit configured to:
      assign several predetermined collision probability values to respective warning levels,
      define for each warning level, a corresponding symbol, and
      establish, based on a comparison between respective future movements and positions of the traffic participants in respective extrapolated movement paths and future movement and position of the motor vehicle in an extrapolated movement path, a single characteristic value per traffic participant, quantifying a collision probability value of the motor vehicle representing a likelihood of collision between the motor vehicle and each of the respective traffic participants; and
    at least one warning device configured to:
      display the corresponding symbol as the single characteristic value of a respective traffic participant reaches each of the respective collision probability values, and
      issue at least one warning of at least one impending collision when the single characteristic value of at least one of the traffic participants reaches a predetermined collision probability value, the warning indicating a direction, relative to the motor vehicle, of the at least one impending collision.

11. The control system according to claim 10, wherein the motor vehicle includes a display unit with a center, and
    wherein the control unit causes the display unit to display a position of the motor vehicle on a center of the display unit and, when the single characteristic value of the at least one of the traffic participants reaches the predetermined collision probability value, at least one symbol, each symbol indicating a direction of the at least one impending collision.

12. The control system according to claim 10, wherein the motor vehicle includes onboard cameras in front of, laterally and behind the motor vehicle, and
    wherein the control unit causes the display unit to display an environment captured by the onboard cameras in front of, laterally and behind the motor vehicle from an aerial perspective.

13. The control system according to claim 10, wherein the motor vehicle includes a loudspeaker, and
    wherein the control unit causes the loudspeaker to issue, as one of the warning and a further warning, an acoustic warning notice indicating a portion of the motor vehicle where the at least one impending collision is expected.

14. The control system according to claim 13, wherein the motor vehicle further includes a display unit and predetermined collision probability values are assigned to respective warning levels, and wherein the control unit causes the display unit to display only an optical warning message as the warning as long as the single characteristic value of each of the traffic participants is below a highest predetermined collision probability value, and causes the loudspeaker to issue, as a further warning, the acoustic warning notice only after the single characteristic value of the at least one of the traffic participants reaches the highest predetermined collision probability value.

15. A motor vehicle having a front, a rear and sides, with traffic participants within a monitoring range around the motor vehicle, comprising:

a control system, including:
sensors configured to capture respective movements and positions of the traffic participants within the monitoring range around the motor vehicle on the front, the rear and the sides;
a control unit configured to:
assign several predetermined collision probability values to respective warning levels,
define for each warning level, a corresponding symbol, and
establish, based on a comparison between respective future movements and positions of the traffic participants in respective extrapolated movement paths and future movement and position of the motor vehicle in an extrapolated movement path, a single characteristic value per traffic participant, quantifying a collision probability of the motor vehicle representing a likelihood of collision between the motor vehicle and each value of the respective traffic participants; and
at least one warning device configured to:
display the corresponding symbol as the single characteristic value of a respective traffic participant reaches each of the respective collision probability values, and
issue at least one warning of at least one impending collision when the single characteristic value of at least one of the traffic participants reaches a predetermined collision probability value, the warning indicating a direction, relative to the motor vehicle, of the at least one impending collision.

* * * * *

UNITED STATES PATENT AND TRADEMARK OFFICE
CERTIFICATE OF CORRECTION

PATENT NO. : 10,252,670 B2
APPLICATION NO. : 15/170485
DATED : April 9, 2019
INVENTOR(S) : Sebastian Zieglmeier et al.

Page 1 of 1

It is certified that error appears in the above-identified patent and that said Letters Patent is hereby corrected as shown below:

On the Title Page

Item [73] (Assignee):
Delete "AUDI AG, Ingolstadt (DE)", and insert -- AUDI CHINA, Beijing (CN) --, therefor.

Signed and Sealed this
Eleventh Day of February, 2020

Andrei Iancu
*Director of the United States Patent and Trademark Office*